United States Patent
Zhang

(10) Patent No.: US 12,292,786 B1
(45) Date of Patent: May 6, 2025

(54) SERVER INTERRUPT OPERATION EXECUTION METHOD AND APPARATUS, DEVICE AND STORAGE MEDIUM

(71) Applicant: SUZHOU METABRAIN INTELLIGENT TECHNOLOGY CO., LTD., Jiangsu (CN)

(72) Inventor: Shuaihao Zhang, Jiangsu (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/001,546

(22) Filed: Dec. 25, 2024

Related U.S. Application Data

(63) Continuation of application No. PCT/CN2023/102843, filed on Jun. 27, 2023.

(30) Foreign Application Priority Data

Nov. 24, 2022 (CN) .......................... 202211483037.5

(51) Int. Cl.
 G06F 1/30 (2006.01)
 G06F 1/324 (2019.01)
 G06F 11/07 (2006.01)

(52) U.S. Cl.
 CPC ............ *G06F 11/0772* (2013.01); *G06F 1/30* (2013.01); *G06F 1/324* (2013.01)

(58) Field of Classification Search
 CPC ......... G06F 11/0772; G06F 1/30; G06F 1/324
 See application file for complete search history.

(56) References Cited

U.S. PATENT DOCUMENTS

| | | | |
|---|---|---|---|
| 5,423,045 A | 6/1995 | Kannan et al. | |
| 6,538,344 B1 * | 3/2003 | Yang ....................... | H02J 9/061 713/340 |
| 7,167,990 B2 * | 1/2007 | Lee ......................... | G11C 11/406 713/320 |
| 7,225,285 B1 * | 5/2007 | Fairman .................. | G06F 13/24 710/266 |

(Continued)

FOREIGN PATENT DOCUMENTS

| | | |
|---|---|---|
| CN | 107122316 A | 9/2017 |
| CN | 111475009 A | 7/2020 |

(Continued)

*Primary Examiner* — Aurel Prifti
(74) *Attorney, Agent, or Firm* — IPro, PLLC

(57) ABSTRACT

A server interruption operation execution method and apparatus. The method comprises: when it is determined that the mains power supply stops supplying power, generating first power failure interruption information for a first component and second power failure interruption information for a second component and a third component; sending the first power failure interrupt information to the first component to control the first component to execute a first interrupt operation; sending the second power failure interrupt information to the second component to control the second component to execute a second interrupt operation; and sending the second power failure interrupt information to the third component to control the third component to execute a third interrupt operation. Therefore, when a server executes a power failure operation, interrupt operations are performed on different types of components in a targeted manner, thereby effectively improving the efficiency of power failure protection.

19 Claims, 3 Drawing Sheets

--- when it is determined that a commercial power supply is stopped, first power failure interrupt information for a first component and second power failure interrupt information for a second component and a third component are generated — 101 send the first power failure interrupt information to the first component to control the first component to perform a first interrupt operation — 102 send the second power failure interrupt information to the second component to control the second component to perform a second interrupt operation — 103 send the second power failure interrupt information to the third component to control the third component to perform a third interrupt operation — 104

(56) References Cited

U.S. PATENT DOCUMENTS

| | | | | |
|---|---|---|---|---|
| 8,433,937 | B1* | 4/2013 | Wheelock | G11B 19/00 |
| | | | | 713/320 |
| 9,256,263 | B1* | 2/2016 | Narayanan | G06F 1/3243 |
| 11,404,906 | B1* | 8/2022 | Wang | H02M 1/008 |
| 2004/0158751 | A1* | 8/2004 | Lam | G06F 1/28 |
| | | | | 713/320 |
| 2006/0082222 | A1* | 4/2006 | Pincu | G06F 1/3203 |
| | | | | 307/29 |
| 2006/0224907 | A1* | 10/2006 | Feldman | G06F 1/28 |
| | | | | 713/300 |
| 2007/0198863 | A1* | 8/2007 | Bose | G06F 1/206 |
| | | | | 713/300 |
| 2008/0091965 | A1* | 4/2008 | Nychka | G06F 1/3275 |
| | | | | 713/323 |
| 2011/0314311 | A1* | 12/2011 | Maeda | G06F 1/3209 |
| | | | | 713/320 |
| 2012/0102348 | A1* | 4/2012 | Muralidhar | G06F 1/3287 |
| | | | | 713/323 |
| 2014/0108831 | A1* | 4/2014 | Dube | G06F 1/3206 |
| | | | | 713/320 |
| 2014/0195838 | A1* | 7/2014 | Yechieli | G06F 1/3209 |
| | | | | 713/323 |
| 2016/0342543 | A1* | 11/2016 | Bonzini | G06F 9/4812 |
| 2018/0024602 | A1* | 1/2018 | Matsumoto | G06F 1/26 |
| | | | | 713/320 |
| 2021/0208663 | A1* | 7/2021 | Cooper | G06F 1/3296 |
| 2022/0187900 | A1* | 6/2022 | Bhanutej | G06F 1/3296 |
| 2022/0300062 | A1* | 9/2022 | Goel | G06F 1/329 |
| 2023/0069344 | A1* | 3/2023 | Langlinais | G06F 1/3228 |

FOREIGN PATENT DOCUMENTS

| | | |
|---|---|---|
| CN | 111475292 A | 7/2020 |
| CN | 112463443 A | 3/2021 |
| CN | 113050896 A | 6/2021 |
| CN | 115543058 A | 12/2022 |
| CN | 115543062 A | 12/2022 |
| JP | S62254222 A | 11/1987 |

* cited by examiner

SERVER INTERRUPT OPERATION EXECUTION METHOD AND APPARATUS, DEVICE AND STORAGE MEDIUM

CROSS-REFERENCE TO RELATED APPLICATION

This application claims the priority of Chinese patent application filed in CNIPA on Nov. 24, 2022, with the application number of 202211483037.5 and the application name of "server interrupt operation execution method and apparatus, device and storage medium", the entire contents of which are incorporated into this application by reference.

FIELD

The present disclosure relates to the technical field of server interrupt operation execution, in particular to a server interrupt operation execution method, a server interrupt operation execution apparatus, an electronic device and a computer non-transitory readable storage medium.

BACKGROUND

When there is a power outage, storage/server equipment needs to use backup power supply scheme to protect data to avoid data loss. For example, related technologies will adopt BBU power failure protection scheme, and BBU (battery back-up unit) is used as a battery backup module of storage equipment, which is mainly used to start external discharge function after a power supply module of storage system is powered off, to ensure the effectiveness of data dump process after power failure.

However, in a practical application, the high-density design of storage/server hardware leads to huge power consumption of the whole machine, and the limited BBU can't support the huge power of the whole machine during power failure, which leads to a loss of stored data during power failure.

SUMMARY

The embodiments of the present disclosure provide a server interrupt operation execution method, an apparatus, an electronic device and a computer non-transitory readable storage medium, to solve the problem of how to improve the efficiency of power failure protection.

The embodiments of the present disclosure disclose a server interrupt operation execution method, wherein the server is used to execute power failure operation, and the server comprises a first component which does not participate in and is not coupled with the power failure operation, a second component which does not participate in but is coupled with the power failure operation, and a third component which participates in and is coupled with the power failure operation, and the method includes:
generating first power failure interrupt information for the first component and second power failure interrupt information for the second component and the third component when it is determined that a commercial power supply is stopped;
sending the first power failure interrupt information to the first component to control the first component to perform a first interrupt operation;
sending the second power failure interrupt information to the second component to control the second component to perform a second interrupt operation;
sending the second power failure interrupt information to the third component to control the third component to perform a third interrupt operation.

In some embodiments, the first component is a transient power reduction component, and the second component and the third component are steady-state power reduction components.

In some embodiments, the server is configured with a logic programming device CPLD, and the method further includes:
filtering the first power failure interrupt information and the second power failure interrupt information by using the logic programming device CPLD.

In some embodiments, the server is configured with a transient power reduction module for the first component, and the first component is an uncoupled data hard disk, and the transient power reduction module is used to provide a corresponding first hard disk power switch for the uncoupled data hard disk.

In some embodiments, the step of sending the first power failure interrupt information to the first component to control the first component to perform the first interrupt operation includes:
sending the first power failure interrupt information to the first component, to use the logic programming device CPLD to close the uncoupled data hard disk by the first hard disk power switch.

In some embodiments, the server is configured with a steady-state power reduction module for the second component, the second component is an interface card, and the steady-state power reduction module is used to provide a corresponding interface card power switch for the interface card.

In some embodiments, the step of sending the second power failure interrupt information to the second component to control the second component to perform the second interrupt operation includes:
sending the second power failure interrupt information to the interface card to close an error reporting function of the steady-state power reduction module;
when the error reporting function is in a closed state, using the logic programming device CPLD to close the interface card by the interface card power switch.

In some embodiments, the method further includes:
unloading the interface card by the steady-state power reduction module.

In some embodiments, the server is configured with a steady-state power reduction module for the second component, the second component is a coupled data hard disk, and the steady-state power reduction module is used to provide a corresponding second hard disk power switch for the coupled data hard disk.

In some embodiments, the step of sending the second power failure interrupt information to the second component to control the second component to perform the second interrupt operation includes:
sending the second power failure interrupt information to the coupled data hard disk to close the error reporting function of the steady-state power reduction module;
when the error reporting function is in the closed state, using the logic programming device CPLD to close the coupled data hard disk by the second hard disk power switch.

In some embodiments, the method further includes:
unloading the coupled data hard disk by the steady-state power reduction module.

In some embodiments, the server is configured with a steady-state power reduction module for the second component, the second component is an onboard chip, and the steady-state power reduction module is used to provide a corresponding onboard chip power switch for the onboard chip, and the step of sending the second power failure interrupt information to the second component to control the second component to perform a second interrupt operation includes:
  sending the second power failure interrupt information to the onboard chip to close the error reporting function of the steady-state power reduction module;
  when the error reporting function is in the closed state, using the logic programming device CPLD to turn off the onboard chip by the onboard chip power switch.

In some embodiments, the method further includes:
  unloading the onboard chip by the steady-state power reduction module.

In some embodiments, the server is configured with a steady-state power reduction module for the third component, the third component is a CPU, and the steady-state power reduction module is used to provide a corresponding frequency reduction interface of the CPU for the CPU, and the step of sending the second power failure interrupt information to the third component to control the third component to perform a third interrupt operation includes:
  sending the second power failure interrupt information to the CPU, to reduce frequency and/or working voltage and/or an interface signal for the CPU by the frequency reduction interface of the CPU by using the steady-state power reduction module.

In some embodiments, the server is configured with a steady-state power reduction module for the third component, the third component is a memory device, and the steady-state power reduction module is used to provide a corresponding frequency reduction interface of the memory device for the memory device, and the step of sending the second power failure interrupt information to the third component to control the third component to perform a third interrupt operation includes:
  sending the second power failure interrupt information to the memory device, to reduce frequency and/or working voltage and/or an interface signal for the memory device by the frequency reduction interface of the memory device by using the steady-state power reduction module.

In some embodiments, the server includes an air-cooled component, and the server is configured with a transient power reduction module for the air-cooled component, and the transient power reduction module is used to configure a corresponding air-cooled component switch for the air-cooled component, and the method further includes:
  generating a third power failure interruption information for the air-cooled component;
  sending the third power failure interrupt information to the air-cooled component, to close the air-cooled component by the air-cooled component switch by using the logic programming device CPLD.

In some embodiments, the method further includes:
  when completion of sending the first power failure interrupt information to the first component to control the first component to perform the first interrupt operation, and completion of sending the second power failure interrupt information to the second component and the third component to control the second component to perform the second interrupt operation and control the third component to perform the third interrupt operation, using the logic programming device CPLD to turn on the air-cooled component by the air-cooled component switch.

In some embodiments, before the step of generating the first power failure interruption information for the first component and the second power failure interruption information for the second component and the third component, the method further includes:
  acquiring a power supply signal;
  determining whether the commercial power supply is stopped by the logic programming device CPLD by the power supply signal.

The present disclosure also provides a server interrupt operation execution apparatus, wherein the server is used to execute power failure operation, and the server includes a first component which does not participate in and is not coupled with the power failure operation, a second component which does not participate in but is coupled with the power failure operation, and a third component which participates in and is coupled with the power failure operation, and the apparatus includes:
  an interrupt information generation module is configured to generate first power failure interrupt information for the first component and second power failure interrupt information for the second component and the third component when it is determined that a commercial power supply is stopped;
  a first interrupt information sending module, configured to send the first power failure interrupt information to the first component to control the first component to perform a first interrupt operation;
  a second interrupt information sending module, configured to send the second power failure interrupt information to the second component to control the second component to perform a second interrupt operation;
  a third interrupt information sending module, configured to send the second power failure interrupt information to the third component to control the third component to perform a third interrupt operation.

In some embodiments, the first component is a transient power reduction component, and the second component and the third component are steady-state power reduction components.

In some embodiments, the server is configured with a logic programming device CPLD, and the apparatus further includes:
  an interrupt information filtering module, configured to filter the first power failure interrupt information and the second power failure interrupt information by using the logic programming device CPLD.

In some embodiments, the server is configured with a transient power reduction module for the first component, and the first component is an uncoupled data hard disk, and the transient power reduction module is used to provide a corresponding first hard disk power switch for the uncoupled data hard disk.

In some embodiments, the step of sending the first power failure interrupt information to the first component to control the first component to perform the first interrupt operation includes:
  a first interrupt information sending submodule, configured to send the first power failure interrupt information to the first component, to use the logic programming device CPLD to close the uncoupled data hard disk by the first hard disk power switch.

In some embodiments, the server is configured with a steady-state power reduction module for the second component, the second component is an interface card, and the steady-state power reduction module is used to provide a corresponding interface card power switch for the interface card. The second interrupt information sending module includes:
an interface card interrupt information sending submodule, configured to send the second power failure interrupt information to the interface card to close an error reporting function of the steady-state power reduction module;
an interface card closing submodule, configured to when the error reporting function is in a closed state, use the logic programming device CPLD to close the interface card by the interface card power switch.

In some embodiments, the apparatus further includes:
an interface card unloading submodule, configured to unload the interface card by the steady-state power reduction module.

In some embodiments, the server is configured with a steady-state power reduction module for the second component, the second component is a coupled data hard disk, and the steady-state power reduction module is used to provide a corresponding second hard disk power switch for the coupled data hard disk. The second interrupt information sending module includes:
a data disk interrupt information sending submodule, configured to send the second power failure interrupt information to the coupled data hard disk to close the error reporting function of the steady-state power reduction module;
a data disk closing submodule, configured to when the error reporting function is in the closed state, use the logic programming device CPLD to close the coupled data hard disk by the second hard disk power switch.

In some embodiments, the apparatus further includes:
a data disk unloading submodule, configured to unload the coupled data hard disk by the steady-state power reduction module.

In some embodiments, the server is configured with a steady-state power reduction module for the second component, the second component is an onboard chip, and the steady-state power reduction module is used to provide a corresponding onboard chip power switch for the onboard chip, The second interrupt information sending module includes:
an onboard chip interrupt information sending submodule, configured to send the second power failure interrupt information to the onboard chip to close the error reporting function of the steady-state power reduction module;
an onboard chip closing submodule, configured to when the error reporting function is in the closed state, use the logic programming device CPLD to turn off the onboard chip by the onboard chip power switch.

In some embodiments, the apparatus further includes:
an onboard chip unloading submodule, configured to unload the onboard chip by the steady-state power reduction module.

In some embodiments, the server is configured with a steady-state power reduction module for the third component, the third component is a CPU, and the steady-state power reduction module is used to provide a corresponding frequency reduction interface of the CPU for the CPU, the third interrupt information sending module includes:
a CPU interrupt information sending submodule, configured to send the second power failure interrupt information to the CPU, to reduce frequency and/or working voltage and/or an interface signal for the CPU by the frequency reduction interface of the CPU by using the steady-state power reduction module.

In some embodiments, the server is configured with a steady-state power reduction module for the third component, the third component is a memory device, and the steady-state power reduction module is used to provide a corresponding frequency reduction interface of the memory device for the memory device, and the third interrupt information sending module includes:
a memory device interrupt information sending submodule, configured to send the second power failure interrupt information to the memory device, to reduce frequency and/or working voltage and/or an interface signal for the memory device by the frequency reduction interface of the memory device by using the steady-state power reduction module.

In some embodiments, the server includes an air-cooled component, and the server is configured with a transient power reduction module for the air-cooled component, and the transient power reduction module is used to configure a corresponding air-cooled component switch for the air-cooled component, and the apparatus further includes:
an air-cooled component interruption information generating module, configured to generate a third power failure interruption information for the air-cooled component;
an air-cooled component interruption information sending module, configured to send the third power failure interrupt information to the air-cooled component, to close the air-cooled component by the air-cooled component switch by using the logic programming device CPLD.

In some embodiments, the apparatus further includes:
an air-cooled component turn on module, configured to when completion of sending the first power failure interrupt information to the first component to control the first component to perform the first interrupt operation, and completion of sending the second power failure interrupt information to the second component and the third component to control the second component to perform the second interrupt operation and control the third component to perform the third interrupt operation, use the logic programming device CPLD to turn on the air-cooled component by the air-cooled component switch.

In some embodiments, before the step of generating the first power failure interruption information for the first component and the second power failure interruption information for the second component and the third component, the apparatus further includes:
a power supply acquisition module, configured to acquire a power supply signal;
a power supply determining module, configured to determine whether the commercial power supply is stopped by the logic programming device CPLD by the power supply signal.

The embodiment of the present disclosure also discloses an electronic device, which includes a processor, a communication interface, a memory and a communication bus, wherein the processor, the communication interface and the memory communicate with each other through the communication bus;

The memory, configured to store computer programs;

And the processor is configured to implement the method according to the embodiments of the present disclosure when executing the program stored in the memory.

The embodiment of the present disclosure also discloses a computer non-transitory readable storage medium, on which instructions are stored, which, when executed by one or more processors, cause the processors to perform the method according to the embodiment of the present disclosure.

The embodiments of the present disclosure include the following advantage:

According to the embodiments of the present disclosure, when it is determined that the commercial power supply stops, the first power failure interrupt information for the first component and the second power failure interrupt information for the second component and the third component are generated; Sending the first power failure interrupt information to a first component to control the first component to perform a first interrupt operation; Sending the second power failure interrupt information to a second component to control the second component to perform a second interrupt operation; The second power failure interrupt information is sent to the third component to control the third component to perform the third interrupt operation, so that when the server performs the power failure operation, the interrupt operation is performed on different types of components in a targeted manner, and the efficiency of efficiency of power failure protection is effectively improved.

DETAILED DESCRIPTION

In order to make the above purpose, features and advantages of the present disclosure more obvious and easy to understand, the present disclosure will be further described in detail with the appended drawings and specific embodiments.

Figure 1:
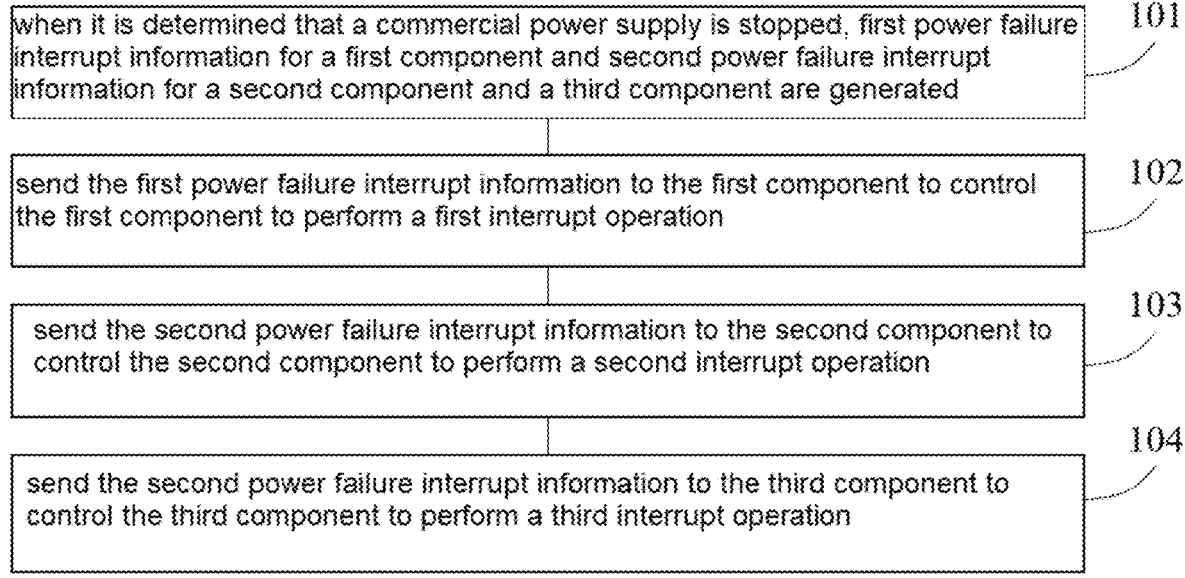
FIG. 1 is a flowchart of steps of a server interrupt operation execution method provided in an embodiment of the present disclosure.

Referring to FIG. 1, a flowchart of steps of a server interrupt operation execution method provided in an embodiment of the present disclosure is shown, which may specifically include the following steps.

Step 101, when it is determined that a commercial power supply is stopped, first power failure interrupt information for a first component and second power failure interrupt information for a second component and a third component are generated;

Step 102, sending the first power failure interrupt information to the first component to control the first component to perform a first interrupt operation;

Step 103, sending the second power failure interrupt information to the second component to control the second component to perform a second interrupt operation;

Step 104: sending the second power failure interrupt information to the third component to control the third component to perform a third interrupt operation.

In practical application, the embodiment of the present disclosure can be applied to, but not limited to, servers, PC (Personal Computer) computers or other hardware devices with storage functions. The server is a kind of computer, which runs faster, has higher load and is more expensive than ordinary computers. The server provides computing or application services for other clients (such as PCs, smart phones, terminals such as ATM (Automated Teller Machine) and even large equipment such as train systems) in the network. The server has high-speed CPU (Central Processing Unit) computing power, long-term reliable operation, strong I/O external data throughput and better scalability.

In the specific implementation, the server in the embodiment of the present disclosure can be used to perform power failure operation, and the power failure operation can refer to a protection process executed by the server to protect the stored data from being lost when the commercial power supply stops.

Commercial power is what we call industrial frequency alternating current (AC), which is characterized by three commonly used quantities of AC: voltage, current and frequency. The electrical frequency of AC in common use all over the world is 50 Hz and 60 Hz, and a distribution of AC voltage for civil use varies from 100V to 380V. A computer room generally introduces three-phase 380V and 50 HZ commercial power as a power supply, but a power rectifier module of equipment uses single-phase 220V voltage.

The server of the embodiment of the present disclosure may include the first component that does not participate in and is not coupled with the power failure operation. Specifically, the first component may be a component or device that does not participate in and is not coupled with the power failure operation when the server performs the power failure operation, such as a SAS/SATA data hard disk.

Certainly, the above examples are only illustrations, and those skilled in the art can take any component or device that does not participate in the power failure operation and is not coupled with the power failure operation when the server performs the power failure operation as the first component, which is not limited by the embodiment of the present disclosure.

The server of the embodiment of the present disclosure may also include the second component that does not participate in the power failure operation but is coupled with the power failure operation. Specifically, the second component may be a component or device that does not participate in the power failure operation but is coupled with the power failure operation when the server performs the power failure operation, such as an interface card, a data-coupled hard disk, an onboard chip, and the like.

Certainly, the above examples are only illustrations, and those skilled in the art can use any component or device that does not participate in the power failure operation but is coupled with the power failure operation when the server performs the power failure operation as the second device, which is not limited by the embodiment of the present disclosure.

The server of the embodiment of the present disclosure may further include the third component that participates in and is coupled with the power failure operation. Specifically, the third component may be a component or device that participates in and is coupled with the power failure operation when the server performs the power failure operation, such as a CPU, a memory device, and the like.

Certainly, the above examples are only illustrations, and those skilled in the art can use any component or device that participates in and is coupled with the power failure operation when the server performs the power failure operation as the third device, which is not limited by the embodiment of the present disclosure.

In practical application, the first component, the second component and the third component of the embodiment of the present disclosure are all devices that can reduce power consumption when the server performs power failure operation. A core invention of the embodiment of the present disclosure lies in that the power consumption of the first component, the second component and the third component is reduced by performing interrupt operation when the server performs power failure operation, to reduce the probability of losing stored data when power is off. Moreover, in the server, some components can be uncoupled from the power failure operation when the server performs the power failure operation, while the other components can be coupled with the power failure operation when the server performs the power failure operation. Therefore, in the embodiments of the present disclosure, the components uncoupled from the power failure operation when the server performs the power failure operation can be defined as transient power reduction components, that is, the first component can be defined as transient power reduction components, and the components coupled with the power failure operation when the server performs the power failure operation as steady power reduction components, that is, the second component and the third component can be defined as power reduction components.

A difference between the transient power reduction component and the steady-state power reduction component is that the transient power reduction component can be directly interrupted when the server performs power failure operation because it is not coupled with the power failure operation, while the steady-state power reduction component is coupled with the power failure operation when the server performs power failure operation, so it needs to perform other processes to interrupt it.

Furthermore, because the steady-state power reduction components also include components that participate in power failure operation when the server performs power failure operation, and components that do not participate in power failure operation.

Therefore, in the specific implementation, in the embodiment of the present disclosure, the first power failure interruption information for the first component and the second power failure interruption information for the second component and the third component can be generated when it is determined that the commercial power supply stops.

The server of the embodiment of the present disclosure may further include a power failure notification module. After generating the first power failure interrupt information for the first component and the second power failure interrupt information for the second component and the third component, in the embodiment of the present disclosure, the first power failure interrupt information may be sent to the first component, the second power failure interrupt information to the second component and the third component respectively by the power failure notification module.

Specifically, the first power failure interrupt information can be used to control the first component to perform the first interrupt operation, the second power failure interrupt information can be used to control the second component to perform the second interrupt operation, and control the third component to perform the third interrupt operation.

According to the embodiment of the present disclosure, when it is determined that the commercial power supply stops, the first power failure interrupt information for the first component and the second power failure interrupt information for the second component and the third component are generated; Sending the first power failure interrupt information to a first component to control the first component to perform a first interrupt operation; Sending the second power failure interrupt information to a second component to control the second component to perform a second interrupt operation; The second power failure interrupt information is sent to the third component to control the third component to perform the third interrupt operation, so that when the server performs the power failure operation, the interrupt operation is performed on different types of components in a targeted manner, and the efficiency of power failure protection is effectively improved efficiency of power failure protection.

On the basis of the above-mentioned embodiment, a modified embodiment of the above-mentioned embodiment is proposed. It should be noted here that in order to make the description brief, only the differences from the above-mentioned embodiment are described in the modified embodiment.

In an alternative embodiment of the present disclosure, the server is configured with a logic programming device CPLD, and further includes:

CPLD is used to filter the first power failure interrupt information and the second power failure interrupt information.

In the specific implementation, in the embodiment of the present disclosure, a logic programming device CPLD in the server can be configured, and CPLD (Complex Programmable Logic Device) is the abbreviation of Complex PLD, which is a more complex logic component than PLD. CPLD is a digital integrated circuit that users construct their own logic functions according to their own needs. The basic design method is to generate corresponding target files with the help of integrated development software platform, schematic diagram, hardware description language and other methods, and transmit the code to the target chip through downloading cable ("in-system programming") to realize a designed digital system.

In practical application, when the server starts to perform power failure operation after the supply of the commercial power stops, the server system may be unstable. In order to successfully send the power failure interrupt information to various components, in the embodiment of the present disclosure, CPLD can be used to filter the first power failure interrupt information and the second power failure interrupt information, for example, the first power failure interrupt information and the second power failure interrupt information are subjected to 10 us steady state, and the steady state is a term of power system, which is a state in which after all transient effects disappear, when all input variables remains constant, a system remains in.

According to the embodiment of the present disclosure, the first power failure interruption information and the second power failure interruption information are filtered by using the logic programming device CPLD, so that a success rate of successfully sending the power failure interruption information to each component is improved, and the efficiency of efficiency of power failure protection is further improved.

In an optional embodiment of the present disclosure, the server is configured with a transient power reduction module for the first component, which is a non-coupled data hard disk, and the transient power reduction module is used to provide a corresponding first hard disk power switch for the non-coupled data hard disk.

In some embodiments, the step of sending the first power failure interrupt information to the first component to control the first component to perform the first interrupt operation includes:

sending the first power failure interrupt information to the first component, to close the uncoupled data hard disk by using the logic programming device CPLD by the first hard disk power switch.

In a specific implementation, and in the embodiment of the present disclosure, a server can be configured with a transient power reduction module for the first component, and the transient power reduction module can be a module for reducing the power consumption of the transient power reduction component.

The transient power reduction module of the embodiment of the present disclosure can be used to provide a corresponding first hard disk power switch for the uncoupled data hard disk, specifically, the uncoupled data hard disk can be a hard disk that is uncoupled to the power failure operation.

In some embodiments, the uncoupled data hard disk is a SAS/SATA data hard disk, and SAS (Serial Attached SCSI) is a new generation of SCSI technology. Same as the popular Serial ATA (SATA) hard disk, it adopts serial technology to obtain higher transmission speed and improve an internal space by shortening a connection line. SAS is a brand-new interface developed after parallel SCSI interface. This interface is designed to improve efficiency, availability and expansibility of the storage system, and to provide compatibility with SATA hard disks. SATA (Serial ATA) hard disk, also known as a serial hard disk, is a mainstream of computer mechanical hard disk, which has basically replaced a traditional PATA hard disk. A full name of SATA is Serial Advanced Technology Attachment. Serial ATA adopts serial connection mode, and serial ATA bus uses embedded clock signal, which has stronger error correction ability. Compared with the past, its biggest difference is that it can check transmission instructions (not just data) and automatically correct errors if found, which greatly improves reliability of data transmission. The serial interface also has advantages of simple structure and hot plug support.

In some embodiments, the first hard disk power switch can be a general input/output interface GPIO (English: General-purpose input/output) for non-coupled data hard disks, which is short for general-purpose input/output, and its function is similar to P0-P3 of 8051, and its pin can be freely used by users by programming. According to reality, a PIN pin can be used as general-purpose input (GPI) or general-purpose output (GPO) or general-purpose input and output (GPIO), such as clk generator, chip select etc. Since a pin can be used for input, output or other special functions, there must be a register to select these functions. For the input, the pin potential can be determined by reading a register; For the output, the pin output a high potential or a low potential can be determined by writing into a register; For other special functions, there are other registers to control them.

The uncoupled data hard disk of the embodiment of the present disclosure can be a transient power reduction component. In practical application, because the transient power reduction component can be a component that is uncoupled from the power failure operation when the server performs the power failure operation, it can be directly interrupted when the server performs the power failure operation.

Therefore, in the embodiment of the present disclosure, the first power failure interrupt information can be sent to the uncoupled data hard disk, to directly use the logic programming device CPLD to close the uncoupled data hard disk by the first hard disk power switch.

According to the embodiment of the present disclosure, the first power failure interrupt information is sent to the first component, so that the logic programming device CPLD is used to close the uncoupled data hard disk by the first hard disk power switch, thus realizing the targeted interrupt operation on the transient power reduction component, and further improving the efficiency of efficiency of power failure protection.

In an optional embodiment of the present disclosure, the server is configured with a steady-state power reduction module for a second component, which is an interface card, and the steady-state power reduction module is used to provide a corresponding interface card power switch for the interface card.

In some embodiments, the step of sending the second power failure interrupt information to the second component to control the second component to perform the second interrupt operation includes:

sending the second power failure interrupt information to the interface card to turn off the error reporting function of the steady-state power reduction module;

when the error reporting function is turned off, CPLD is used to close the interface card by the interface card power switch.

In a specific implementation, the embodiment of the present disclosure can configure the server with a steady-state power reduction module for the second component, and the steady-state power reduction module can be a module for reducing power consumption for the steady-state power reduction component.

In some embodiments, the interface card can be used as the second component, and the interface card can be a wide area network interface card. Modules and interface cards are aimed at middle and high grade modular routers and switches, but not at fixed configuration routers and switches. Usually, network modules are developed to expand functions of LAN, while interface cards refer to WAN (wide area network) interface cards. Through WAN interface cards, routers and switch products can conveniently achieve more efficient WAN access. The advantage of products with modular design is that they can effectively protect users' investment, truly achieve on-demand purchase, and at the same time, the products can be strongly expanded to meet expanding needs of business. For example, Cisco 2600 series can be customized to meet the needs of any network service by network modules. The wide applications of these modules include: multi-service voice and data integration, analog and ISDN dialing, ATM access, low-density switching, intrusion detection, serial device integration and so on. Some of these network modules are integrated with interfaces, which can be used directly; Some have no interface, only slots, which need to be equipped with interface cards to use; Some have both interfaces and slots, so interface cards may not be used or selected according to the situation.

The steady-state power reduction module of the embodiment of the present disclosure can be used to provide a corresponding interface card power switch for the interface card. In some embodiments, the interface card power switch can be a general input/output interface GPIO for the interface card, and the interface card of the embodiment of the present disclosure can be a steady-state power reduction component. In practical application, because the steady-state power reduction component can be a component coupled with the power failure operation when the server performs the power failure operation, other processes need to be performed before it can be interrupted when the server performs the power failure operation, so in the embodiment of the present disclosure, the second power failure interruption information can be sent to the interface card to turn off the error reporting function of the steady-state power reduction module to avoid triggering an abnormality when the power supply of the interface card is turned off, and when the error reporting function is turned off, the logic programming device CPLD is used to close the interface card by the interface card power switch.

In the embodiment of the present disclosure, the second power failure interrupt information is sent to the interface card to turn off the error reporting function of the steady-state power reduction module; When the error reporting function is in the off state, CPLD is used to close the interface card by the interface card power switch, which realizes the targeted interrupt operation for the steady-state power reduction components, thus further improving the efficiency of power failure protection.

In an alternative embodiment of the present disclosure, the method further includes:
unloading the interface card by the steady-state power reduction module.

In the specific implementation, in order to further reduce the power consumption of the interface card, in the embodiment of the present disclosure, the interface card can also be unloaded by the steady-state power reduction module, that is, the embodiment of the present disclosure can uninstall the interface card by the steady-state power reduction module, further reducing the power consumption of the interface card, thereby further improving the efficiency of power failure protection.

In an optional embodiment of the present disclosure, the server is configured with a steady-state power reduction module for a second component, which is a coupled data hard disk, and the steady-state power reduction module is used to provide a corresponding second hard disk power switch for the coupled data hard disk.

In some embodiments, the step of sending the second power failure interrupt information to the second component to control the second component to perform the second interrupt operation includes:
sending a second power failure interrupt information to the coupled data hard disk to turn off the error reporting function of the steady-state power reduction module;
when the error reporting function is in the off state, the logic programming device CPLD is used to close the coupled data hard disk by the second hard disk power switch.

In a specific implementation, the embodiment of the present disclosure can configure the server with a steady-state power reduction module for the second component, and the steady-state power reduction module can be a module for reducing power consumption for the steady-state power reduction component.

In some embodiments, the second component of the embodiment of the present disclosure may be a coupled data hard disk, specifically, the coupled data hard disk may be a data hard disk coupled with the power failure operation during the power failure operation.

In some embodiments, the coupled data hard disk may be an NVMe data hard disk. NVMe SSD is a standard interface protocol solid-state hard disk developed for PCIe. NVMe SSD removes all kinds of restrictions imposed by the old standard on traditional SSD (Solid State Disk or Solid State Drive, SSD for short), supports all common operating systems, has good scalability, and has the advantages of low latency, low energy consumption and high performance. The traditional AHCI protocol has strong compatibility, but it can't provide the best performance when it is used with SSD connected by PCIe (PCI-Express, Peripheral Component Interconnect Express, a standard of high-speed serial computer expansion bus) bus. The planning of NVMe makes full use of the low latency and parallelism of PCIe SSD, and gives consideration to the processor and platform architecture to maximize the performance of SSD. Solid-state hard disks have faster reading and writing speed than mechanical hard disks, and most machines use SATA bus standards. The actual maximum transmission of NVMe is about 600 MB/s.

The steady-state power reduction module of the embodiment of the present disclosure can be used to provide a corresponding second hard disk power switch for the coupled data hard disk. In some embodiments, the second hard disk power switch can be a general input/output interface GPIO for the coupled data hard disk, and the coupled data hard disk of the embodiment of the present disclosure can be a steady-state power reduction component. In practical application, since the steady-state power reduction component can be a component coupled with the power failure operation when the server performs the power failure operation, therefore, when the server performs power failure operation, it needs to perform other processes to interrupt it. Therefore, in the embodiment of the present disclosure, the second power failure interruption information can be sent to the coupled data hard disk to turn off the error reporting function of the steady-state power reduction module to avoid triggering an abnormality when the power supply of the coupled data hard disk is turned off, and when the error reporting function is turned off, the logic programming device CPLD is used to close the coupled data hard disk by the second hard disk power switch.

In the embodiment of the present disclosure, the error reporting function of the steady-state power reduction module is turned off by sending the second power failure interrupt information to the coupled data hard disk; When the error reporting function is in the off state, the logic programming device CPLD is used to close the coupled data hard disk by the power switch of the second hard disk, which realizes the targeted interrupt operation for the steady-state power reduction component, thus further improving the efficiency of power failure protection.

In an alternative embodiment of the present disclosure, the method further includes:
unloading the coupled data hard disk by the steady-state power reduction module.

In the specific implementation, in order to further reduce the power consumption of the coupled data hard disk, in the embodiment of the present disclosure, the coupled data hard disk can also be unloaded by the steady-state power reduction module, that is, the embodiment of the present disclosure can uninstall the coupled data hard disk by the steady-state power reduction module, further reducing the power consumption of the coupled data hard disk, thereby further improving the efficiency of power failure protection.

In an optional embodiment of the present disclosure, the server is configured with a steady-state power reduction module for a second component, which is an onboard chip, and the steady-state power reduction module is used to provide a corresponding onboard chip power switch for the onboard chip, and the step of sending a second power failure interrupt information to the second component to control the second component to perform a second interrupt operation includes:

sending a second power failure interrupt information to the onboard chip to turn off the error reporting function of the steady-state power reduction module;

when the error reporting function is in the off state, the onboard chip is turned off by using the logic programming device CPLD by the onboard chip power switch.

In a specific implementation, the embodiment of the present disclosure can configure the server with a steady-state power reduction module for the second component, and the steady-state power reduction module can be a module for reducing power consumption for the steady-state power reduction component.

In some embodiments, the second component of the embodiment of the present disclosure may be an onboard chip, specifically, the onboard chip may be a chip coupled with the power failure operation during the power failure operation.

In some embodiments, the onboard chip may be a SAS/FC/PCIe switch chip.

The SAS chip can be a chip using SAS technology.

A FC chip, also known as Flip chip, is a pin-free structure and generally contains circuit units. It is designed to be electrically and mechanically connected to the circuit by an appropriate number of solder balls (covered with conductive adhesive) on its surface.

The PCIe switch provides expansion or aggregation capabilities and allows more devices to connect to a PCIe port. They act as packet routers and identify which path a given packet needs to take according to the address or other routing information. They are a bridge from PCIe to PCIe, and the PCIe switch chip is a chip with PCIe switch technology.

The steady-state power reduction module of the embodiment of the present disclosure can be used to provide a corresponding onboard chip power switch for the onboard chip. In some embodiments, the onboard chip power switch can be a general input/output interface GPIO for the onboard chip, and the onboard chip of the embodiment of the present disclosure can be a steady-state power reduction component. In practical application, because the steady-state power reduction component can be a component coupled with the power failure operation when the server performs the power failure operation, Other processes need to be performed before it can be interrupted, so in the embodiment of the present disclosure, the second power failure interruption information can be sent to the onboard chip to turn off the error reporting function of the steady-state power reduction module to avoid triggering an abnormality when the onboard chip power supply is turned off, and when the error reporting function is turned off, the onboard chip is turned off by using the logic programming device CPLD.

In the embodiment of the present disclosure, the error reporting function of the steady-state power reduction module is turned off by sending the second power failure interrupt information to the onboard chip; When the error reporting function is in the off state, the logic programming device CPLD is used to turn off the onboard chip by the onboard chip power switch, which realizes the targeted interrupt operation for the steady-state power reduction component, thus further improving the efficiency of power failure protection.

In an alternative embodiment of the present disclosure, the method further includes:

unloading the onboard chip by the steady-state power reduction module.

In the specific implementation, in order to further reduce the power consumption of the onboard chip, in this embodiment the onboard chip can also be unloaded by the steady-state power reduction module, that is, the embodiment of the present disclosure can unload the onboard chip by the steady-state power reduction module, further reducing the power consumption of the onboard chip, thereby further improving the efficiency of power failure protection.

In an optional embodiment of the present disclosure, the server is configured with a steady-state power reduction module for a third component, which is a CPU, and the steady-state power reduction module is used to provide a corresponding interface of CPU frequency reduction for the CPU. The step of sending a second power failure interrupt information to the third component to control the third component to perform a third interrupt operation includes:

sending a second power failure interrupt information to the CPU, to reduce the frequency, and/or the working voltage, and/or the interface signal for the CPU by the frequency reduction interface of the CPU by adopting a steady-state power reduction module.

In a specific implementation, the embodiment of the present disclosure can configure the server with a steady-state power reduction module for the third component, and the steady-state power reduction module can be a module for reducing power consumption for the steady-state power reduction component.

In some embodiments, the third component of the embodiment of the present disclosure may be a CPU, specifically, the CPU may be a component that participates in and is coupled with the power failure operation during the power failure operation.

A computer processor is a functional unit that interprets and executes instructions, also known as a central processing unit or a CPU. It is the central nervous system of a computer, in contrast to the peripherals around the processor and memory, such as keyboards, monitors, disks and tape drives. Each processor has a unique set of operation commands, which can be called the instruction set of the processor, such as storing, calling and so on. Computer designers like to call computers machines, so instruction sets are sometimes called machine instructions, and the binary language in which these instructions are written is also called machine language. Central Processing Unit (CPU) is the computing core and control core of a computer.

The steady-state power reduction module of the embodiment of the present disclosure can be used to provide a corresponding interface of CPU frequency reduction for the CPU, for example, the interface of CPU frequency reduction can be an application programming interface (API) for the CPU, and the CPU of the embodiment of the present disclosure can be a steady-state power reduction component participating in power failure operation. In the embodiment of the present disclosure, the second power failure interrupt information can be sent to the CPU, to reduce the frequency and/or working voltage of the CPU and/or an interface signal for the CPU, such as, a CPU_HOT (CPU overheating) signal, by using a steady-state power reduction module by the interface of CPU frequency reduction.

According to the embodiment of the present disclosure, by sending the second power failure interrupt information to the CPU, the frequency and/or working voltage of the CPU are reduced by the frequency reduction interface of the CPU by using the steady-state power reduction module, and/or the interrupt operation is performed on the steady-state power reduction components participating in the power failure operation in a targeted manner according to the interface signal of the CPU, so that the efficiency of power failure protection is further improved.

In an optional embodiment of the present disclosure, the server is configured with a steady-state power reduction module for a third component, which is a memory device, and the steady-state power reduction module is used to provide a corresponding frequency reduction interface of the memory device for the memory device, and the step of sending a second power failure interrupt information to the third component to control the third component to perform a third interrupt operation includes:

sending a second power failure interrupt information to the memory device, to reduce the frequency of the memory device and/or the working voltage and/or the interface signal for the memory device by the frequency reduction interface of the memory device by adopting a steady-state power reduction module.

In a specific implementation, the embodiment of the present disclosure can configure the server with a steady-state power reduction module for the third component, and the steady-state power reduction module can be a module for reducing power consumption for the steady-state power reduction component.

In some embodiments, the third component of the embodiment of the present disclosure may be a memory device, specifically, the memory device may be a component that participates in and is coupled with the power failure operation during the power failure operation.

Memory device is an important part of computer, also called internal memory and main memory, which is used to temporarily store the operation data in CPU and the data exchanged with external memory such as hard disk. It is a bridge between external memory and CPU. All programs in the computer run in the memory, and the performance of the memory affects the overall level of the computer. As soon as the computer starts to run, the operating system will transfer the data to be operated from the memory to the CPU for operation, and when the operation is completed, the CPU will send the result.

The steady-state power reduction module of the embodiment of the present disclosure can be used to provide a corresponding frequency reduction interface of the memory device for the memory device, for example, the frequency reduction interface of the memory device can be an API for the memory device, and the memory device of the embodiment of the present disclosure can be a steady-state power reduction component participating in power failure operation, and in the embodiment of the present disclosure a second power failure interrupt information can be sent to the memory device, to reduce frequency and/or working voltage and/or an interface signal, such as, a MEM_HOT (memory overheating) signal, for the memory device by the frequency reduction interface of the memory device by using the steady-state power reduction module.

According to the embodiment of the present disclosure, by sending the second power failure interrupt information to the memory device, the frequency and/or working voltage of the memory device, and/or the interface signal of the memory device are reduced by the frequency reduction interface of the memory device by using the steady-state power reduction module, so that the interruption operation is performed on the steady-state power reduction components participating in the power failure operation, and the efficiency of power failure protection is further improved.

In an optional embodiment of the present disclosure, the server includes an air-cooled component, and the server is configured with a transient power reduction module for the air-cooled component, and the transient power reduction module is used to configuring a corresponding air-cooled component switch for the air-cooled component, and the method further includes:

generating third power failure interruption information for the air-cooled component;

The third power failure interrupt information is sent to the air-cooled module, so that the air-cooled module can be turned off by the air-cooled module switch by using the logic programming device CPLD.

In the specific implementation, the air-cooled component of the embodiment of the present disclosure can be a component that participates in the power failure operation but is not coupled with the power failure operation, so the server can be configured with a transient power reduction module for the air-cooled component.

The transient power reduction module of the embodiment of the present disclosure can be used to provide the corresponding air-cooled module switch for the air-cooled module.

In some embodiments, the air-cooled component of the embodiment of the present disclosure can be a cooling fan.

In some embodiments, the switch of the air-cooled component can be a general input/output interface GPIO for the air-cooled component.

The air-cooled component in the embodiment of the present disclosure can be a transient power reduction component. In practical application, because the transient power reduction component can be a component that is not coupled with the power failure operation when the server performs the power failure operation, it can be directly interrupted when the server performs the power failure operation. Therefore, when it is determined that the power supply of the commercial power is stopped, in the embodiment of the present disclosure, a third power failure interrupt information for the air-cooled component can be generated and the third power failure interrupt information is sent to the air-cooled component, to directly close the air-cooled component by using the logic programming device CPLD.

According to the embodiment of the present disclosure, the first power failure interrupt information is sent to the first component, so that the logic programming device CPLD is used to close the uncoupled data hard disk by the first hard disk power switch, so that the targeted interrupt operation is performed on the transient power reduction components participating in the power failure operation, thereby further improving the efficiency of power failure protection.

In an alternative embodiment of the present disclosure, the method further includes:

when the steady-state power reduction module completes the control of the second device and the third device, the logic programming device CPLD is used to turn on the air-cooled module by the air-cooled module switch.

In practical application, in order to ensure data security of the server and prevent the server from being damaged due to overheating, in the embodiment of the present disclosure, the logic programming device CPLD can be used to turn on the air-cooled component by the air-cooled component switch when sending the first power failure interrupt information to the first component to control the first component to perform the first interrupt operation, and sending the second power failure interrupt information to the second component and the third component to control the second component to perform the second interrupt operation and control the third component to perform the third interrupt operation are completed.

According to the embodiment of the present disclosure, when the first power failure interrupt information is sent to the first component to control the first component to perform the first interrupt operation and the second power failure interrupt information is sent to the second component and the third component to control the second component to perform the second interrupt operation and control the third component to perform the third interrupt operation, the logic programming device CPLD is used to turn on the air-cooled component by the air-cooled component switch. Thus, it not only ensures that when the server performs the power failure operation, the power consumption of each component is reduced, and at the same time, when the power failure operation is completed, the server can be cooled by the air-cooled component to avoid data loss caused by overheating and damage of the server, thus not only improving the efficiency of power failure protection, but also improving the security of data during power failure protection.

In an alternative embodiment of the present disclosure, before the step of generating the first power failure interruption information for the first component and the second power failure interruption information for the second component and the third component, the method further includes:

acquiring a power supply signal;

The logic programming device CPLD determines whether a commercial power supply stops or not by the power supply signal.

In practical application, a determination time of power failure directly determines the efficiency of power failure protection, and the shorter the determination time of power failure, the faster the power failure operation can be performed. In the embodiment of the present disclosure, the power supply signal can be obtained, and whether the power supply of the commercial power is stopped is determined by the power supply signal by the logic programming device CPLD. For example, the power supply signal of the commercial power is connected to the general interrupt controller of the system by CPLD. When the commercial power is powered off, a state of the hardware commercial power supply signal PS_OK is reversed, and the CPLD captures the change of the PS_OK signal.

According to the embodiment of the present disclosure, by the logic programming device CPLD, it is determined whether the power supply of the commercial power is stopped by the power supply signal, which improves the efficiency of determining whether the power is cut off, thus further improving the efficiency of power failure protection.

In order to make persons skilled in the art better understand the embodiment of the present disclosure, the embodiment of the present disclosure is explained with a complete example.

Firstly, a scheme flow of the storage/server power failure is divided into three modules: a power failure notification module, a transient power reduction module and a steady-state power reduction module;

Secondly, the power failure notification module, the power supply signal of the commercial power is connected to the general interrupt of the system by CPLD. When the commercial power fails, the state of the hardware commercial power supply signal PS_OK is reversed, and CPLD captures the change of the PS_OK signal, and then triggers a system interrupt after filtering the signal (for example, remaining in a steady state for 10 us).

The system interrupt is divided into an upper half and a lower half. The upper half is responsible for notifying the interrupt to all related modules in the system that handle the power failure operation. Each related module completes notification reception of the power failure interrupt in a handle of the upper half of the interrupt, and then notifies the transient power reduction module in a form of the lower half of the interrupt.

As mentioned above, it is ensured that the power failure event is notified to the transient power reduction module, the steady power reduction module, and related modules participating in the power failure processing flow in an interrupt manner.

Thirdly, the transient power reduction module classifies the components (devices, components, FRU) in a hardware system of a whole machine into three levels, including a component which does not participate in and is not coupled with the power failure operation, a component which does not participate in but is coupled with the power failure operation, and a component which participates in and is coupled with the power failure operation and can further reduce power consumption.

Components, elements, FRU that do not participate in power failure operation and are not coupled with power failure operation and transient power reduction components belong to a power reduction object of transient power reduction module, and are respectively controlled to reduce power consumption, such as SAS/SATA data disk in Table 1 below, to ensure that the power reduction control of transient power reduction components is completed within 100 us.

TABLE 1

| component | participate in power failure operation | coupled with power failure operation | reduce power consumption | power reduction measurements |
| --- | --- | --- | --- | --- |
| interface card | NO | YES | YES | 1) After an interruption notice occurs due to power failure, the steady-state power reduction module turns off the AER reporting function of all the interface cards, so as to avoid triggering abnormality when the power supply is turned off; Then call CPLD interface to forcibly turn off the power supply of interface card; 2) The hardware provides interface card power supply GPIO to CPLD, and CPLD provides an interface for forcibly closing power for system software; 3) The steady-state power reduction module calls a interface card driver to unload the interface card equipment. |

TABLE 1-continued

| component | participate in power failure operation | coupled with power failure operation | reduce power consumption | power reduction measurements |
|---|---|---|---|---|
| SAS/SATA number | NO | NO | YES | The hardware provides hard disk power switch GPIO to CPLD, and CPLD detects a state change of PS_OK, then forcibly closes hard disk power |
| NVMe data disk | NO | YES | YES | 1) The steady-state power reduction module turns on the DPC reporting function of the upstream interface of all NVMe data disk when starting, after an interruption notice occurs due to power failure, turns off the AER reporting function, so as to avoid triggering abnormality when the power supply is turned off; 2) The hardware provides interface card power supply GPIO to CPLD, and CPLD detects a state change of PS_OK, then forcibly closes NVMe disk power; 3) The steady-state power reduction module calls a NVMe driver to unload the NVMe equipment. |
| onboard SAS/FC/PCI eswitch chip | NO | YES | YES | 1) After an interruption notice occurs due to power failure, the steady-state power reduction module turns off the AER reporting function of SAS/FC/PCIe switch chip, so as to avoid triggering abnormality when the power supply is turned off; 2) The hardware provides SAS/FC/PCIe switch chip power supply GPIO to CPLD, and CPLD detects a state change of PS_OK, then forcibly closes power; 3) The steady-state power reduction module calls PCIe, and chip driver to unload the chip equipment. |
| BMC | YES | YES | NO | NULL |
| CPU | YES | YES | YES | After the interruption notice occurs due to power failure, the steady-state power reduction module calls kernel APIs, so as to reduce CPU frequency and working voltage to the lowest, or lower a CPU_HOT signal |
| memory | YES | YES | YES | After the Interruption notice occurs due to power failure, pull down a MEM_HOT signal |
| system disk | YES | YES | NO | NULL |
| fan | YES | NO | YES - | 1) The hardware provides a fan power switch GPIO to CPLD, the CPLD detects a state chage of PS_OK, and then forcibly closes the fan power; 2) After the above work of the steady-state power reduction module is completed. the fan power supply is turned on, and the system is cooled by dynamic frequency modulation |

Fourthly, the steady-state power reduction module, for the components that do not participate in the power failure operation and the component that participates in and is coupled with the power failure operation and can further reduce power consumption need to be decoupled systematically first by system software and then be further reduced the power consumption.

For components that do not participate in power failure operation but are coupled with power failure operation, they include but are not limited to interface cards and onboard SAS/FC/PCIe switch chips; The power reduction process needs to be completed as follows:
1) After an interruption notice occurs due to power failure, the steady-state power reduction module turns off the PCIe AER reporting function of the component, to avoid triggering abnormality when the power supply is turned off; Then call CPLD interface to forcibly turn off the power supply of the interface card;
2) The hardware provides interface card power supply GPIO to CPLD, and CPLD provides a power interface for forcibly closing components for the steady-state power reduction module;
3) The system software calls a component driver to unload the interface card equipment.

For components that participate in the power failure operation and are coupled with power failure operation but can further reduce power consumption, they include but are not limited to CPU and memory; The power reduction process needs to be completed as follows:

1) After the interruption notice occurs due to power failure, the steady-state power reduction module calls kernel APIs for the CPU, to reduce CPU frequency and working voltage to the lowest, or lower a CPU_HOT signal;
2) After the interruption notice occurs due to power failure, for the memory, the power consumption can be reduced by pulling down a MEM_HOT signal, etc.

Finally, after the above work of the steady-state power reduction module is completed, the fan power supply is turned on, and the system is cooled by dynamic frequency modulation.

By the above-mentioned methods, power reduction measurement is taken for the memory and server BBU (battery backup) standby power scheme, which can reduce power consumption of a whole system and enhance product competitiveness in a wide range, which is embodied in the following aspects:

A size and weight of BBU decrease, and for the same BBU space size and weight a data storage capacity of power failure cache can be increased, thus greatly improving product performance; After a bottleneck of standby power is solved, it can support the hardware of the whole machine to use more power-consuming and competitive components.

It should be noted that for the sake of simple description, the method embodiments are all expressed as a series of action combinations, but those skilled in the art should know that the present disclosure embodiment is not limited by the described action sequence, because some steps can be performed in other sequences or at the same time according to the present disclosure embodiment. Secondly, those skilled in the art should also know that the embodiments described in the specification are all preferred embodiments, and the actions involved are not necessarily necessary for the embodiments of the present disclosure.

Figure 2:
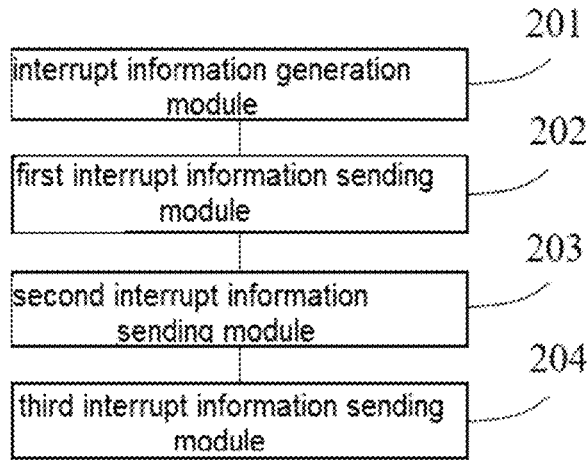
FIG. 2 is a structural block diagram of a server interrupt operation execution apparatus provided in an embodiment of the present disclosure.

Referring to FIG. 2, a structural block diagram of a server interrupt operation execution apparatus provided in an embodiment of the present disclosure is shown, which may specifically include the following modules:

an interrupt information generation module 201, configured to generate first power failure interrupt information for the first component and second power failure interrupt information for the second component and the third component when it is determined that a commercial power supply is stopped;

a first interrupt information sending module 202, configured to send the first power failure interrupt information to the first component to control the first component to perform the first interrupt operation;

a second interrupt information sending module 203, configured to send a second power failure interrupt information to a second component to control the second component to perform a second interrupt operation;

a third interrupt information sending module 204, configured to send the second power failure interrupt information to the third component to control the third component to perform the third interrupt operation.

In some embodiments, the server is configured with a logic programming device CPLD, and may further include:

an interrupt information filtering module, which uses CPLD to filter the first power failure interrupt information and the second power failure interrupt information.

In some embodiments, the server is configured with a transient power reduction module for a first component, which is a non-coupled data hard disk, and the transient power reduction module is used to provide a corresponding first hard disk power switch for the non-coupled data hard disk, and the first interrupt information sending module may include:

a first interrupt information sending submodule, configured to send the first power failure interrupt information to the first component, to close the uncoupled data hard disk by using the logic programming device CPLD by the first hard disk power switch.

In some embodiments, the server is configured with a steady-state power reduction module for a second component, which is an interface card, and the steady-state power reduction module is used to provide a corresponding interface card power switch for the interface card, and the second interrupt information sending module may include:

an interface card interrupt information sending submodule, configured to send the second power failure interrupt information to the interface card to close the error reporting function of the steady-state power reduction module;

an interface card closing sub-module, configured to close the interface card by the interface card power switch by using CPLD when the error reporting function is in the closed state.

In some embodiments, the apparatus can also include:

an interface card unloading submodule, configured to unload the interface card by the steady-state power reduction module.

In some embodiments, the server is configured with a steady-state power reduction module for a second component, which is a coupled data hard disk, and the steady-state power reduction module is used to provide a corresponding second hard disk power switch for the coupled data hard disk, and the second interrupt information sending module may include:

a data hard disk interrupt information sending submodule, configured to send the second power failure interrupt information to the coupled data hard disk to turn off the error reporting function of the steady-state power reduction module;

a data hard disk closing submodule, configured to close the coupled data hard disk by the second hard disk power switch by using the logic programming device CPLD when the error reporting function is in the closed state.

In some embodiments, the apparatus can also include:

a data hard disk unloading submodule, configured to unload the coupled data hard disk by the steady-state power reduction module.

In some embodiments, the server is configured with a steady-state power reduction module for a second component, which is an onboard chip, and the steady-state power reduction module is used to provide a corresponding onboard chip power switch for the onboard chip, and the second interrupt information sending module may include:

an onboard chip interrupt information sending submodule, configured to send the second power failure interrupt information to the onboard chip, to turn off the error reporting function of the steady-state power reduction module;

an onboard chip closing submodule, configured to close the onboard chip by using the logic programming device CPLD by the onboard chip power switch when the error reporting function is in the closed state.

In some embodiments, the apparatus can also include:

an onboard chip unloading submodule, configured to unload the onboard chip by the steady-state power reduction module.

In some embodiments, the server is configured with a steady-state power reduction module for a third component, which is a CPU, and the steady-state power reduction module is used to provide a corresponding interface of CPU frequency reduction for the CPU, and the third interrupt information sending module may include:

a CPU interrupt information sending submodule, configured to send the second power failure interrupt information to the CPU, to reduce the frequency, and/or the working voltage and/or the interface signal for the CPU by the interface of CPU frequency reduction by using the steady-state power reduction module.

In some embodiments, the server is configured with a steady-state power reduction module for a third component, which is a memory device, and the steady-state power reduction module is used to provide a corresponding frequency reduction interface of the memory device for the memory device, and the third interrupt information sending module may include:

a memory device interrupt information sending submodule, configured to send the second power failure interrupt information to the memory device, to reduce the frequency of the memory device and/or the working voltage and/or the interface signal for the memory device by the frequency reduction interface of the memory device by using the steady-state power reduction module.

In some embodiments, the server includes an air-cooled component, and the server is configured with a transient power reduction module for the air-cooled component, and the transient power reduction module is used to configure a corresponding air-cooled component switch for the air-cooled component, and the device may further include:

an air-cooled component interrupt information generation module, configured to generate third power failure interrupt information for the air-cooled component;

an air-cooled component interrupt information sending module, configured to send the third power failure interrupt information to the air-cooled component, to close the air-cooled component by the air-cooled component switch by using the logic programming device CPLD.

In some embodiments, the apparatus can also include:

an air-cooled component opening module, configured to open the air-cooled component by an air-cooled component switch by using a logic programming device CPLD when the first power failure interrupt information is sent to the first component to control the first interrupt operation and the second power failure interrupt information is sent to the second component and the third component to control the second interrupt operation and the third component to control the third interrupt operation.

In some embodiments, the apparatus can also include:

a power supply signal acquisition module, configured to acquire a power supply signal;

a power supply signal determination module, configured to determine whether the power supply of the commercial power is stopped by the logic programming device CPLD by the power supply signal.

As for the apparatus embodiment, because it is basically similar to the method embodiment, the description is relatively simple, and the relevant points can only be found in part of the description of the method embodiment.

Figures 3, 4:
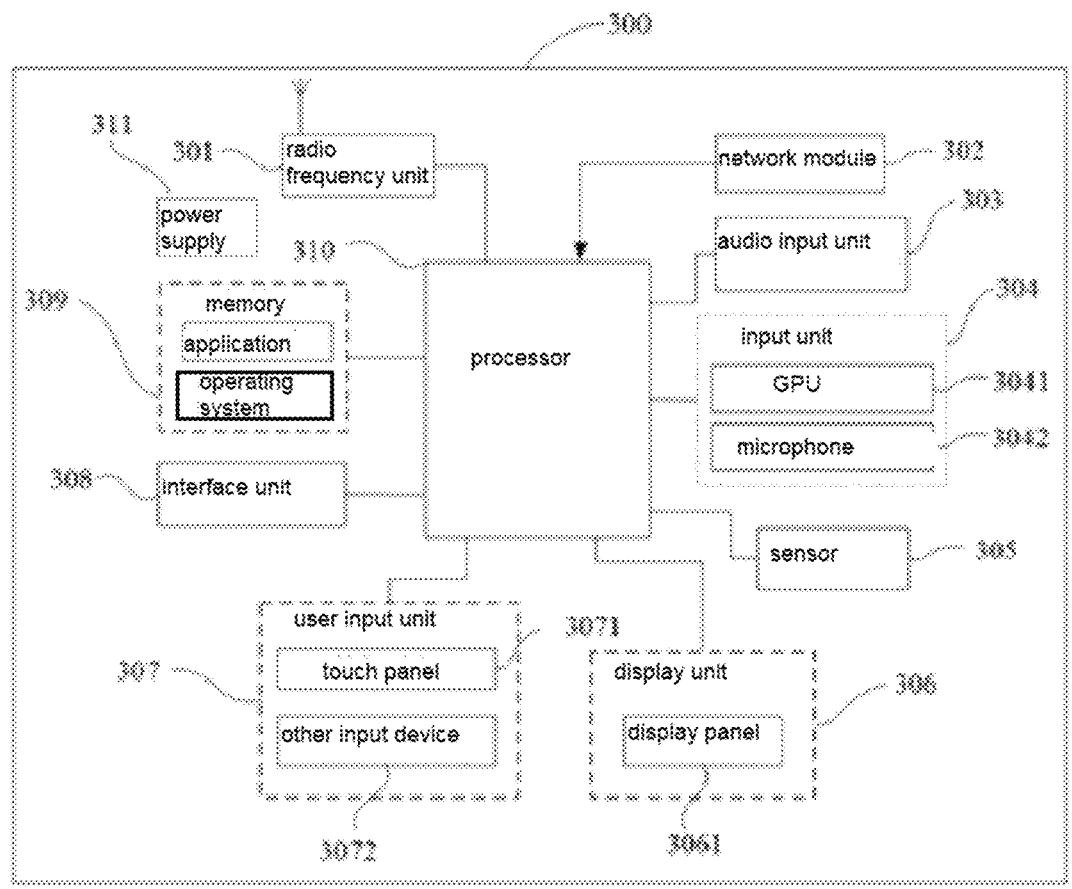
FIG. 3 is a hardware structure block diagram of an electronic device provided in an embodiment of the present disclosure.
FIG. 4 is a schematic diagram of a computer non-transitory readable storage medium provided in an embodiment of the present disclosure.
Figure 5:
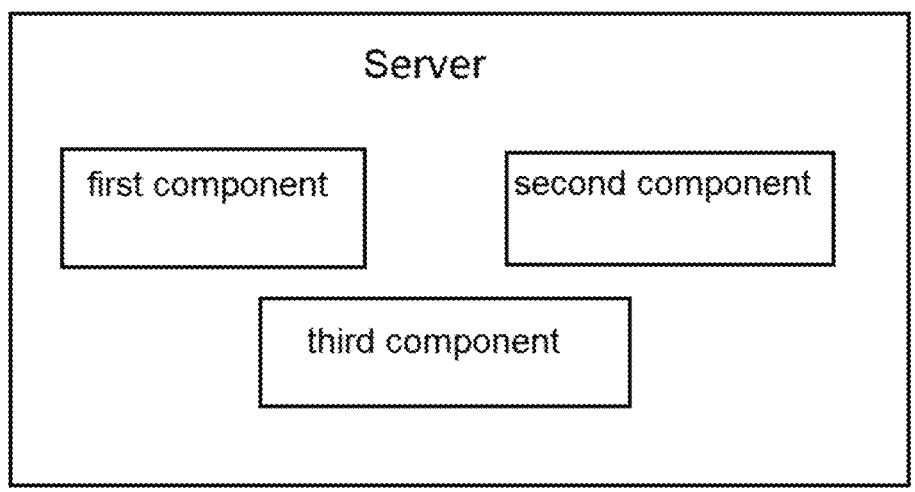
FIG. 5 is a schematic diagram of a server interrupt operation execution system provided in an embodiment of the present disclosure.

Moreover, referring to FIG. 3, the embodiment of the present disclosure also provides an electronic device 300, which includes a processor 310, a memory 309, and a computer program stored in the memory 309 and running on the processor 310. When the computer program is executed by the processor 310, it realizes the various processes of the above-mentioned server interrupt operation execution method embodiment, and can achieve the same technical effect, so to avoid repetition, it will not be repeated here.

Referring to FIG. 4, the embodiment of the present disclosure also provides a computer non-transitory readable storage medium 40, on which a computer program 401 is stored. When the computer program 401 is executed by a processor, each process of the above-mentioned server interrupt operation execution method embodiment can be realized, and the same technical effect can be achieved. In order to avoid repetition, it will not be repeated here. Wherein, computer non-transitory readable storage medium 40, such as Read-Only Memory (ROM), Random Access Memory (RAM), magnetic disk or optical disk, etc.

FIG. 3 is a schematic diagram of the hardware structure of an electronic device for implementing various embodiments of the present disclosure.

The electronic device 300 includes, but is not limited to, a radio frequency unit 301, a network module 302, an audio output unit 303, an input unit 304, a sensor 305, a display unit 306, a user input unit 307, an interface unit 308, a memory 309, a processor 310, and a power supply 311. It can be understood by those skilled in the art that the structure of the electronic equipment shown in FIG. 3 does not constitute a limitation to the electronic equipment, and the electronic equipment may include more or less components than shown, or combine some components, or have different component arrangements. In the embodiment of the present disclosure, electronic devices include, but are not limited to, mobile phones, tablet computers, notebook computers, palmtop computers, vehicle-mounted terminals, wearable devices, pedometers and the like.

It should be understood that in this embodiment of the present disclosure, the RF unit 301 can be used to receive and send signals during the process of receiving and sending information or talking, specifically, the downlink data from the base station is received and processed by the processor 310; Moreover, the uplink data is sent to the base station. Generally, the RF unit 301 includes, but is not limited to, an antenna, at least one amplifier, a transceiver, a coupler, a low noise amplifier, a duplexer, and the like. Moreover, the RF unit 301 can also communicate with networks and other devices by a wireless communication system.

Electronic devices provide users with wireless broadband Internet access by the network module 302, such as helping users to send and receive emails, browse web pages and access streaming media.

The audio output unit 303 can convert audio data received by the radio frequency unit 301 or the network module 302 or stored in the memory 309 into audio signals and output them as sound. Moreover, the audio output unit 303 can also provide audio output related to specific functions performed by the electronic device 300 (for example, call signal receiving sound, message receiving sound, etc.). The audio output unit 303 includes a speaker, a buzzer and a receiver.

The input unit 304 is used to receive audio or video signals. The input unit 304 may include a Graphics Processing Unit (GPU) 3041 and a microphone 3042. The graphics processor 3041 processes image data of still pictures or videos obtained by an image capture device (such as a camera) in a video capture mode or an image capture mode. The processed image frame may be displayed on the display unit 306. The image frames processed by the graphics processor 3041 can be stored in the memory 309 (or other storage media) or transmitted via the radio frequency unit 301 or the network module 302. The microphone 3042 can receive sounds and can process such sounds into audio data. The processed audio data can be converted into a format that can be sent to the mobile communication base station via the radio frequency unit 301 in the case of telephone conversation mode.

The electronic device 300 also includes at least one sensor 305, such as a light sensor, a motion sensor and other sensors. Specifically, the optical sensor includes an ambient light sensor and a proximity sensor, wherein the ambient light sensor can adjust the brightness of the display panel 3061 according to the brightness of ambient light, and the proximity sensor can turn off the display panel 3061 and/or backlight when the electronic device 300 moves to the ear. As a kind of motion sensor, accelerometer sensor can detect the magnitude of acceleration in all directions (generally three axes), and the magnitude and direction of gravity at rest, which can be used to identify the attitude of electronic equipment (such as horizontal and vertical screen switching, related games, magnetometer attitude calibration), vibration identification related functions (such as pedometer, tapping), etc. The sensor 305 may also include a fingerprint sensor, a pressure sensor, an iris sensor, a molecular sensor, a gyroscope, a barometer, a hygrometer, a thermometer, an infrared sensor, etc., which are not described in detail here.

The display unit 306 is used to display information input by the user or information provided to the user. The display unit 306 may include a display panel 3061, which may be configured in the form of a Liquid Crystal Display (LCD) or an organic light-emitting diode (OLED).

The user input unit 307 can be used to receive input digital or character information and generate key signal input related to user settings and function control of electronic equipment. Specifically, the user input unit 307 includes a touch panel 3071 and other input devices 3072. The touch panel 3071, also known as a touch screen, can collect the touch operations of users on or near it (such as the operations of users on or near the touch panel 3071 with any suitable objects or accessories such as fingers and a stylus). The touch panel 3071 may include a touch detection device and a touch controller. Wherein, the touch detection device detects the touch orientation of the user, detects the signal brought by the touch operation, and transmits the signal to the touch controller; The touch controller receives touch information from the touch detection device, converts it into contact coordinates, and then sends it to the processor 310, and receives the command sent by the processor 310 and executes it. Moreover, the touch panel 3071 can be realized by various types such as resistive, capacitive, infrared and surface acoustic wave. Moreover to the touch panel 3071, the user input unit 307 may also include other input devices 3072. Specifically, other input devices 3072 may include, but are not limited to, a physical keyboard, function keys (such as volume control buttons, switch buttons, etc.), a trackball, a mouse, and a joystick, which are not described in detail here.

Further, the touch panel 3071 can be covered on the display panel 3061. When the touch panel 3071 detects a touch operation on or near it, it is transmitted to the processor 310 to determine the type of touch event, and then the processor 310 provides corresponding visual output on the display panel 3061 according to the type of touch event. Although in FIG. 3, the touch panel 3071 and the display panel 3061 are two independent components to realize the input and output functions of the electronic device, in some embodiments, the touch panel 3071 and the display panel 3061 can be integrated to realize the input and output functions of the electronic device, and the details are not limited here.

The interface unit 308 is an interface between an external device and the electronic device 300. For example, the external device may include a wired or wireless headset port, an external power supply (or battery charger) port, a wired or wireless data port, a memory card port, a port for connecting a device with an identification module, an audio input/output (I/O) port, a video I/O port, an earphone port, and the like. The interface unit 308 may be used to receive input (e.g., data information, power, etc.) from an external device and transmit the received input to one or more elements within the electronic device 300 or may be used to transmit data between the electronic device 300 and the external device.

The memory 309 can be used to store software programs and various data. The memory 309 may mainly include a storage program area and a storage data area, wherein the storage program area may store an operating system, application programs required by at least one function (such as sound playing function, image playing function, etc.), etc. The data storage area can store data (such as audio data, phone book, etc.) created according to the use of the mobile phone. Moreover, the memory 309 may include a high-speed random access memory, and may also include a non-transitory memory, such as at least one disk memory device, a flash memory device, or other volatile solid-state memory devices.

The processor 310 is the control center of electronic equipment, which connects all parts of the whole electronic equipment with various interfaces and lines, and performs various functions and processes data of the electronic equipment by running or executing software programs and/or modules stored in the memory 309 and calling data stored in the memory 309, thus monitoring the electronic equipment as a whole. The processor 310 may include one or more processing units; Preferably, the processor 310 can integrate an application processor and a modem processor, wherein the present disclosure processor mainly handles the operating system, user interface and application programs, and the modem processor mainly handles wireless communication. It can be understood that the above modem processor may not be integrated into the processor 310.

The electronic device 300 can also include a power supply 311 (such as a battery) for supplying power to various components. Preferably, the power supply 311 can be logically connected with the processor 310 by a power management system, so that the functions of managing charging, discharging and power consumption management can be realized by the power management system.

Moreover, the electronic device 300 includes some unillustrated functional modules, which are not described in detail here.

It should be noted that in this paper, the terms "comprising", "including" or any other variation thereof are intended to cover non-exclusive inclusion, so that a process, method, article or device including a series of elements includes not only those elements, but also other elements not explicitly listed, or elements inherent to such process, method, article or device. Without more restrictions, an element defined by the phrase "including one" does not exclude the existence of other identical elements in the process, method, article or device including the element.

Through the description of the above embodiments, those skilled in the art can clearly understand that the methods of the above embodiments can be realized by means of software and necessary general hardware platform, and of course they can also be realized by hardware, but in many cases, the former is the better embodiment. Based on this understanding, the technical scheme of the present disclosure can be embodied in the form of a software product, which is stored in a storage medium (such as ROM/RAM, magnetic disk, optical disk) and includes several instructions to make a terminal (which can be a mobile phone, a computer, a server, an air conditioner, or a network device, etc.) execute the methods of various embodiments of the present disclosure.

The embodiments of the present disclosure have been described above with the attached drawings, but the present disclosure is not limited to the above specific embodiments, which are only schematic, not restrictive. Under the inspiration of the present disclosure, persons skilled in the art can make many forms without departing from the purpose of the present disclosure and the scope protected by the claims, which are all within the protection of the present disclosure.

Those skilled in the art can realize that the units and algorithm steps of various examples described in connection with the embodiments disclosed in the embodiments of the present disclosure can be realized by electronic hardware, or a combination of computer software and electronic hardware. Whether these functions are implemented in hardware or software depends on the specific application and design constraints of the technical scheme. Skilled people can use different methods to realize the described functions for each specific application, but this implementation should not be considered beyond the scope of the present disclosure.

It can be clearly understood by those skilled in the art that for the convenience and conciseness of description, the specific working processes of the systems, devices and units described above can refer to the corresponding processes in the aforementioned method embodiments, and will not be repeated here.

In the embodiments provided by the present disclosure, it should be understood that the disclosed devices and methods can be realized in other ways. For example, the device embodiment described above is only schematic. For example, the division of units is only a logical function division. In actual implementation, there may be other division methods, such as multiple units or components can be combined or integrated into another system, or some features can be ignored or not implemented. On the other hand, the mutual coupling or direct coupling or communication connection shown or discussed can be indirect coupling or communication connection by some interfaces, devices or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

Moreover, each functional unit in each embodiment of the present disclosure can be integrated into one processing unit, or each unit can exist physically alone, or two or more units can be integrated into one unit.

Functions can be stored in a computer-readable storage medium if they are realized in the form of software functional units and sold or used as independent products. Based on this understanding, the technical scheme of the present disclosure can be embodied in the form of a software product, which is stored in a storage medium and includes several instructions to make a computer device (which can be a personal computer, a server, a network device, etc.) execute all or part of the steps of the methods of various embodiments of the present disclosure. The aforementioned storage media includes: U disk, mobile hard disk, ROM, RAM, magnetic disk or optical disk and other media that can store program codes.

The above is only the specific implementation of the present disclosure, but the protection scope of the present disclosure is not limited to this. Any person skilled in the art can easily think of changes or substitutions within the technical scope disclosed in the present disclosure, which should be covered by the present disclosure. Therefore, the protection scope of the present disclosure should be based on the protection scope of the claims.

The invention claimed is:

1. A server interrupt operation execution method, wherein the server is used to execute power failure operation, and the server comprises a first component which does not participate in the power failure operation and is a transient power reduction component, a second component which does not participate in the power failure operation, and a third component which participates in the power failure operation, and the second component and the third component are steady-state power reduction components, the method comprises:
generating first power failure interrupt information for the first component and second power failure interrupt information for the second component and the third component when it is determined that a commercial power supply is stopped;
sending the first power failure interrupt information to the first component to control the first component to perform a first interrupt operation; wherein the first component comprises an uncoupled data hard disk belonging to the transient power reduction component;
sending the second power failure interrupt information to the second component to control the second component to perform a second interrupt operation; wherein the second component comprises a coupled data hard disk belonging to the steady-state power reduction components;
sending the second power failure interrupt information to the third component to control the third component to perform a third interrupt operation; wherein the third component comprises a memory device belonging to the steady-state power reduction components, and the first component, the second component and the third component are power reduction components of different levels, the first interrupt operation is an interrupt operation for the first component, the second interrupt operation is an interrupt operation for the second component, and the third interrupt operation is an interrupt operation for the third component.

2. The method according to claim 1, wherein the server is configured with a logic programming device CPLD, and the method further comprises:
filtering the first power failure interrupt information and the second power failure interrupt information by using the logic programming device CPLD.

3. The method according to claim 2, wherein the server is configured with a transient power reduction module for the first component, and the transient power reduction module is used to provide a corresponding first hard disk power switch for the uncoupled data hard disk.

4. The method according to claim 3, wherein the step of sending the first power failure interrupt information to the first component to control the first component to perform the first interrupt operation comprises:
sending the first power failure interrupt information to the first component, to use the logic programming device CPLD to close the uncoupled data hard disk by the first hard disk power switch.

5. The method according to claim 2, wherein the server is configured with a steady-state power reduction module for the second component, the second component is an interface card, and the steady-state power reduction module is used to provide a corresponding interface card power switch for the interface card.

6. The method according to claim 5, wherein the step of sending the second power failure interrupt information to the second component to control the second component to perform the second interrupt operation comprises:
sending the second power failure interrupt information to the interface card to close an error reporting function of the steady-state power reduction module;
when the error reporting function is in a closed state, using the logic programming device CPLD to close the interface card by the interface card power switch interface card power switch.

7. The method according to claim 5, further comprising:
unloading the interface card by the steady-state power reduction module.

8. The method according to claim 2, wherein the server is configured with a steady-state power reduction module for the second component, and the steady-state power reduction module is used to provide a corresponding second hard disk power switch for the coupled data hard disk.

9. The method according to claim 8, wherein the step of sending the second power failure interrupt information to the second component to control the second component to perform the second interrupt operation comprises:
   sending the second power failure interrupt information to the coupled data hard disk to close the error reporting function of the steady-state power reduction module;
   when the error reporting function is in the closed state, using the logic programming device CPLD to close the coupled data hard disk by the second hard disk power switch.

10. The method according to claim 8, further comprising:
    unloading the coupled data hard disk by the steady-state power reduction module.

11. The method according to claim 2, wherein the server is configured with a steady-state power reduction module for the second component, the second component is an onboard chip, and the steady-state power reduction module is used to provide a corresponding onboard chip power switch for the onboard chip, and the step of sending the second power failure interrupt information to the second component to control the second component to perform a second interrupt operation comprises:
    sending the second power failure interrupt information to the onboard chip to close the error reporting function of the steady-state power reduction module;
    when the error reporting function is in the closed state, using the logic programming device CPLD to turn off the onboard chip by the onboard chip power switch.

12. The method according to claim 11, further comprising:
    unloading the onboard chip by the steady-state power reduction module.

13. The method according to claim 2, wherein the server is configured with a steady-state power reduction module for the third component, the third component is a CPU (Central Processing Unit), and the steady-state power reduction module is used to provide a corresponding interface of CPU frequency reduction for the CPU, and the step of sending the second power failure interrupt information to the third component to control the third component to perform a third interrupt operation comprises:
    sending the second power failure interrupt information to the CPU, to reduce frequency and/or working voltage and/or an interface signal for the CPU by the frequency reduction interface of the CPU by using the steady-state power reduction module.

14. The method according to claim 2, wherein the server is configured with a steady-state power reduction module for the third component, and the steady-state power reduction module is used to provide a corresponding frequency reduction interface of the memory device for the memory device, and the step of sending the second power failure interrupt information to the third component to control the third component to perform a third interrupt operation comprises:
    sending the second power failure interrupt information to the memory device, to reduce frequency and/or working voltage and/or an interface signal for the memory device by the frequency reduction interface of the memory device by using the steady-state power reduction module.

15. The method according to claim 2, wherein the server comprises an air-cooled component, and the server is configured with a transient power reduction module for the air-cooled component, and the transient power reduction module is used to configure a corresponding air-cooled component switch for the air-cooled component, and the method further comprises:
    generating a third power failure interruption information for the air-cooled component;
    sending the third power failure interrupt information to the air-cooled component, to close the air-cooled component by the air-cooled component switch by using the logic programming device CPLD.

16. The method according to claim 15, further comprising:
    when completion of sending the first power failure interrupt information to the first component to control the first component to perform the first interrupt operation, and completion of sending the second power failure interrupt information to the second component and the third component to control the second component to perform the second interrupt operation and control the third component to perform the third interrupt operation, using the logic programming device CPLD to turn on the air-cooled component by the air-cooled component switch.

17. The method according to claim 2, wherein before the step of generating the first power failure interruption information for the first component and the second power failure interruption information for the second component and the third component, the method further comprises:
    acquiring a power supply signal;
    determining whether the commercial power supply is stopped by the logic programming device CPLD by the power supply signal.

18. An electronic device comprising a processor, a communication interface, a memory and a communication bus, wherein the processor, the communication interface and the memory communicate with each other by the communication bus;
    the memory is configured to store computer programs;
    the processor is configured to implement the method according to claim 1 when executing the program stored in the memory.

19. A computer non-transitory readable storage medium having stored thereon instructions which, when executed by one or more processors, cause the processors to perform the method according to claim 1.

* * * * *